(12) United States Patent
Matsui

(10) Patent No.: US 8,992,112 B2
(45) Date of Patent: Mar. 31, 2015

(54) MOUNTING STRUCTURE AND FUNCTIONAL UNIT

(75) Inventor: Masao Matsui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 175 days.

(21) Appl. No.: 13/299,444

(22) Filed: Nov. 18, 2011

(65) Prior Publication Data
US 2012/0163907 A1    Jun. 28, 2012

(30) Foreign Application Priority Data
Dec. 24, 2010 (JP) ................................. 2010-287634

(51) Int. Cl.
*F16B 21/02* (2006.01)
*G03G 21/16* (2006.01)

(52) U.S. Cl.
CPC .............. *G03G 21/168* (2013.01); *F16B 21/02* (2013.01); *G03G 21/1619* (2013.01)
USPC ............................ 403/348; 403/350; 403/375

(58) Field of Classification Search
CPC ........... F16B 21/02; F16B 21/04; Y10S 24/53
USPC ........... 403/348, 375, 381, 349, 350; 439/546
See application file for complete search history.

(56) References Cited

U.S. PATENT DOCUMENTS

| | | | | |
|---|---|---|---|---|
| 2,151,089 A | * | 3/1939 | Douglas | 439/546 |
| 4,029,953 A | * | 6/1977 | Natoli | 362/382 |
| 5,407,363 A | * | 4/1995 | Polgar et al. | 439/546 |
| 5,607,251 A | * | 3/1997 | Rafn | 403/348 |
| 6,338,631 B1 | | 1/2002 | Hashimoto et al. | |
| 6,450,834 B1 | | 9/2002 | Polgar et al. | |
| 7,118,138 B1 | * | 10/2006 | Rowley et al. | 285/332.2 |
| 7,603,059 B2 | * | 10/2009 | Marumoto | 399/167 |
| 7,661,215 B2 | * | 2/2010 | Okamoto | 40/620 |
| 2003/0077117 A1 | * | 4/2003 | Kanatani et al. | 403/348 |
| 2008/0267696 A1 | | 10/2008 | De Wilde | |

FOREIGN PATENT DOCUMENTS

| | | |
|---|---|---|
| CN | 1428899 A | 7/2003 |
| CN | 101272835 A | 9/2008 |
| JP | 05-072076 U | 9/1993 |
| JP | 07-280425 A | 10/1995 |
| JP | 11-339909 | 10/1999 |
| JP | 2001-283992 A | 10/2001 |

* cited by examiner

*Primary Examiner* — Daniel P Stodola
*Assistant Examiner* — Jonathan Masinick
(74) *Attorney, Agent, or Firm* — Renner, Otto, Boisselle & Sklar, LLP

(57) ABSTRACT

The mounting structure includes a pair of first shape portions, a pair of second shape portions, and a pair of third shape portions. The pair of first shape portions are opposed to each other to define therebetween a passage which allows the component to be inserted into and withdrawn from the mounting structure therethrough. The pair of second shape portions are opposed to each other to define therebetween a space which allows the component inserted through the passage between the pair of first shape portions to rotate therein. The pair of third shape portions come into engagement with the engagement arms when the component positioned between the pair of second shape portions is rotated through a predetermined angle. The pair of third shape portions are opposed to each other and incorporated in the pair of second shape portions.

4 Claims, 13 Drawing Sheets

US 8,992,112 B2

MOUNTING STRUCTURE AND FUNCTIONAL UNIT

CROSS REFERENCE

This Nonprovisional application claims priority under 35 U.S.C. §119(a) on Patent Application No. 2010-287634 filed in Japan on Dec. 24, 2010, the entire contents of which are hereby incorporated by reference.

BACKGROUND OF THE INVENTION

The present invention relates to a mounting structure configured to mount a component thereon, as well as a functional unit provided with such a mounting structure.

An electronic apparatus, such as an image forming apparatus, includes a functional unit such as a secondary transfer belt unit. Such a functional unit has electrical parts including an electromagnetic clutch and a sensor. A junction cable included in an electric circuit associated with such electrical parts is sometimes provided at an intermediate portion thereof with a coupler pair as a terminal interconnecting a plurality of electrical wiring lines, such as a power line and a signal line, collectively.

The coupler pair includes first and second couplers which are detachably coupled to each other. Among components including such a first coupler, there are components of the type which is provided with a pair of engagement arms having an elastic force against a force working in a widthwise direction. This type of first coupler is mounted by bringing the pair of engagement arms into engagement with an engagement hole formed in a panel-shaped mounting portion provided on a housing. Then, the second coupler is coupled to the first coupler thus mounted on the mounting portion (see Japanese Patent Laid-Open Publication No. HEI07-280425 for example). Such an arrangement offers an improved operability in interconnecting a plurality of electric wiring lines.

However, when the first coupler is removed from the mounting portion for the reason of electrical parts replacement or other reason, the first coupler is withdrawn from the engagement hole by deforming the engagement arms against their elastic force. Such a removing operation is poor in operability and might break the engagement arms.

In view of the problem described above, a feature of the present invention is to provide a mounting structure which allows a component to be removed therefrom with high operability and which is capable of preventing breakage of the engagement arms.

SUMMARY OF THE INVENTION

A mounting structure according to the present invention is configured to mount thereon a component having opposite sides formed with respective engagement arms. The mounting structure includes a pair of first shape portions, a pair of second shape portions, and a pair of third shape portions.

The pair of first shape portions are opposed to each other to define therebetween a passage which allows the component to be inserted into and withdrawn from the mounting structure therethrough. The pair of second shape portions are opposed to each other to define therebetween a space which allows the component inserted through the passage between the pair of first shape portions to rotate therein. The pair of third shape portions come into engagement with the engagement arms when the component positioned between the pair of second shape portions is rotated through a predetermined angle. The pair of third shape portions are opposed to each other and incorporated in the pair of second shape portions.

The pair of first shape portions are configured to allow the component to pass through the passage only when the engagement arms are positioned to project in a vertically upward and downward direction from the component. The pair of second shape portions are configured to prevent the component from coming off the mounting structure through any other way than the passage defined between the pair of first shape portions. The pair of third shape portions are configured to release the engagement with the engagement arms when the component is reversely rotated in a direction opposite to the direction of rotation of the component performed during the insertion of the component.

DETAILED DESCRIPTION OF THE INVENTION

Hereinafter, a mounting structure according to an embodiment of the present invention will be described with reference to the attached drawings.

Figure 1:
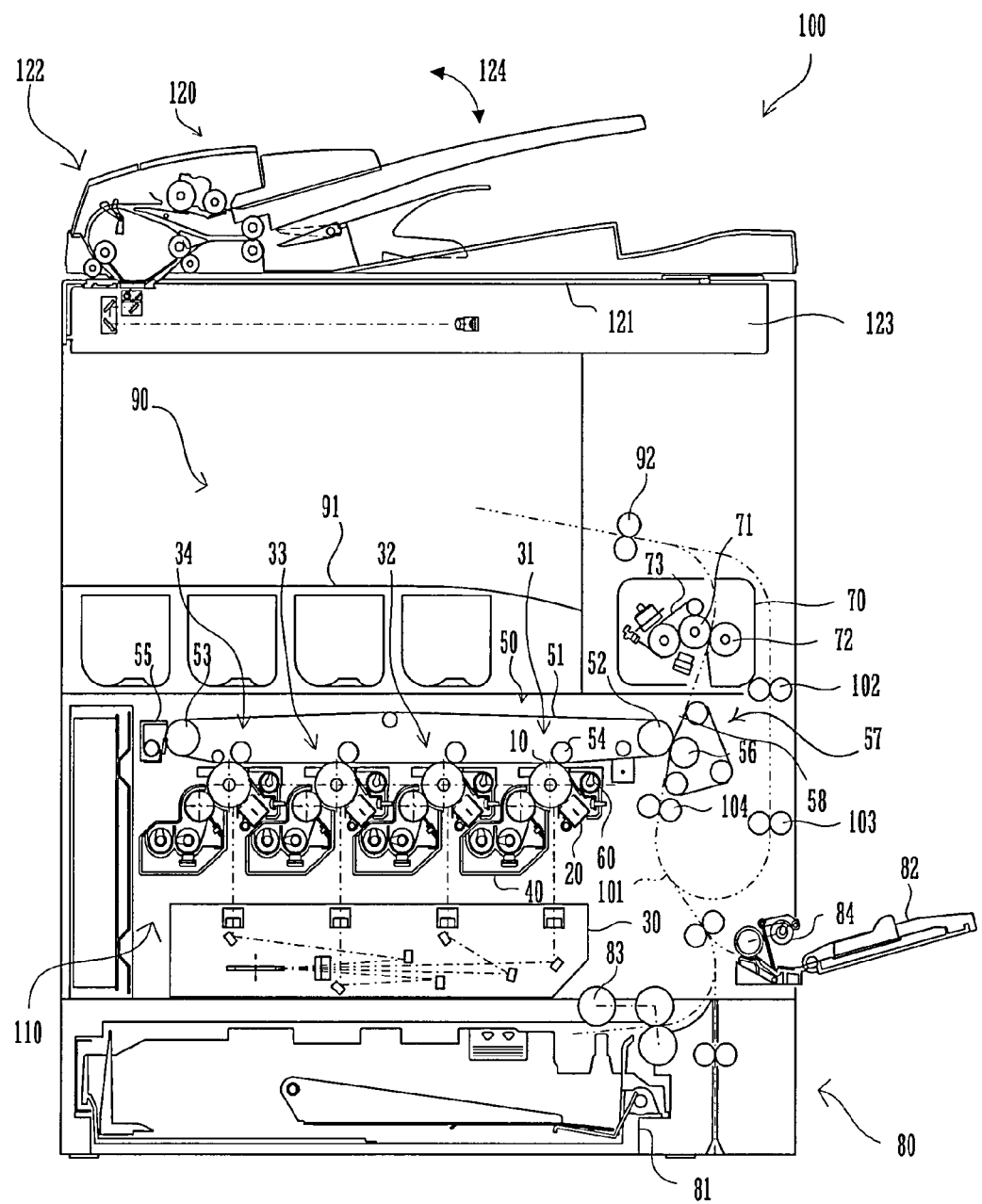
FIG. 1 is a view illustrating the configuration of an image forming apparatus incorporating a secondary transfer belt unit having a mounting structure according to an embodiment of the present invention.

FIG. 1 is a view illustrating the configuration of an image forming apparatus 100 incorporating a secondary transfer belt unit 57 having a mounting structure 200 according to the embodiment of the present invention.

The image forming apparatus 100 is configured to form a polychrome or monochrome image on a predetermined sheet (i.e., recording sheet) according to image data transmitted thereto from the outside. The image forming apparatus 100 comprises a document processing device 120, a sheet feeding section 80, an image forming section 110, and a sheet output section 90. The document processing device 120 includes a document platen 121, a document feeder 122, and a document reading section 123. The document platen 121 is formed from transparent glass and is capable of placing a document thereon. The document feeder 122 feeds documents one by one from a document tray loaded with the documents. The document feeder 122 is pivotable in directions indicated by arrow 124. When the document feeder 122 pivots in a direction such as to expose the document platen 121, a document can be placed on the document platen 121. The document reading section 123 reads a document being fed by the document feeder 122 or a document placed on the document platen 121.

The sheet feeding section 80 includes a sheet feed cassette 81, a manual feed cassette 82, and pickup rollers 83 and 84. The sheet feed cassette 81 is a tray for stacking standard size sheets thereon. The manual feed cassette 82 is a tray capable of placing non-standard size sheets thereon. The pickup roller 83, which is located adjacent an end portion of the sheet feed cassette 81, picks up sheets one by one from the sheet feed cassette 81 to feed each sheet into a sheet feed path 101. Likewise, the pickup roller 84, which is located adjacent an end portion of the manual feed cassette 82, picks up sheets one by one from the manual feed cassette 82 to feed each sheet into the sheet feed path 101.

The image forming section 110 includes image forming stations 31 to 34, an exposure unit 30, an intermediate transfer belt unit 50, and a fixing unit 70. The image forming stations 31 to 34, exposure unit 30, intermediate transfer belt unit 50 and fixing unit 70 form an equivalent of the "functional unit" defined by the present invention. The image forming stations 31 to 34 are each provided with a photoreceptor drum 10, an electrostatic charger device 20, a developing device 40, and a cleaner unit 60. The image forming stations 31 to 34 are configured to form respective color images by using respective colors, i.e., black (K), cyan (C), magenta (M) and yellow (Y). In the present embodiment, description is directed to the image forming station 31.

The photoreceptor drum 10 rotates during image formation and is configured to bear a developer image thereon. Around the photoreceptor drum 10, there are disposed the electrostatic charger device 20, exposure unit 30, developing device 40, intermediate transfer belt unit 50 and cleaner unit 60 in that order from an upstream side in the direction of rotation of the photoreceptor drum 10. The fixing unit 70 is provided on the sheet feed path 101 at a location most downstream in the image forming section 110.

The electrostatic charger device 20 is means for electrostatically charging a peripheral surface of the photoreceptor drum 10 to a predetermined potential uniformly. Besides an electrostatic charger device of the charger type as shown in FIG. 1, a contact-type electrostatic charger device using a roller or a brush may be used.

The exposure unit 30 has the function of exposing the photoreceptor drum 10 in an electrostatically charged state to light according to image data inputted, thereby forming an electrostatic latent image according to the image data on the peripheral surface of the photoreceptor drum 10. The exposure unit 30 is constructed as a laser scanning unit (LSU) having a laser beam emitting section, a reflecting mirror and the like. In the exposure unit 30, there are disposed a polygon mirror for laser beam scanning, and optical components, such as a lens and a mirror, for directing laser light reflected by the polygon mirror to the photoreceptor drum 10. The exposure unit 30 may employ a technique using a writing head having an array of other light-emitting devices, such as ELs or LEDs for example. The developing device 40 is configured to visualize the electrostatic latent image formed on the photoreceptor drum 10 by using toner.

The intermediate transfer belt unit 50 includes an intermediate transfer belt 51, an intermediate transfer belt driving roller 52, an intermediate transfer belt driven roller 53, an intermediate transfer roller 54, and an intermediate transfer belt cleaning unit 55.

The intermediate transfer belt driving roller 52, intermediate transfer belt driven roller 53 and intermediate transfer roller 54, about which the intermediate transfer belt 51 is entrained, drive the intermediate transfer belt 51 for rotation. The intermediate transfer roller 54 performs application of a transfer bias for transferring the toner image from the photoreceptor drum 10 onto the intermediate transfer belt 51.

The intermediate transfer belt 51 is positioned to come into contact with the photoreceptor drum 10. The intermediate transfer belt 51 has the function of forming the toner image thereon by transfer of the toner image from the photoreceptor drum 10 onto the intermediate transfer belt 51. The intermediate transfer belt 51 is formed into an endless belt by using a film having a thickness of about 100 μm to about 150 μm for example.

The transfer of the toner image from the photoreceptor drum 10 to the intermediate transfer belt 51 is achieved by the intermediate transfer roller 54 in contact with the reverse side of the intermediate transfer belt 51. The intermediate transfer roller 54 is applied with a high transfer bias voltage (i.e., a high voltage having a polarity (+) opposite to the polarity (−) of the toner charged) in order to transfer the toner image. The intermediate transfer roller 54 is a roller comprising a shaft of metal (e.g., stainless steel) having a diameter of 8 to 10 mm as a base, and an electrically conductive elastic material (e.g., EPDM or urethane foam) covering the surface of the shaft. The electrically conductive elastic material enables the intermediate transfer belt 51 to be uniformly applied with the high voltage. While the present embodiment uses the transfer electrode in the form of a roller, it is possible to use a transfer electrode in the form of a brush or the like.

Electrostatic latent images thus visualized on the respective photoreceptor drums 10 are transferred onto the intermediate transfer belt 51 so as to be superimposed on one another. Image information obtained by superimposition of the toner images is fed by rotation of the intermediate transfer belt 51 to a contact position between a recording sheet and the intermediate transfer belt 51 and is then transferred onto the recording sheet by a secondary transfer belt unit 57 including a transfer roller 56 disposed at the contact position. The secondary transfer belt unit 57 is equivalent to the "functional unit" defined by the present invention.

At that time, the intermediate transfer belt 51 and the transfer roller 56 are pressed against each other at a predetermined nip pressure, while the transfer roller 56 is applied with a voltage for transferring the toner to the recording sheet (i.e., a high voltage having a polarity (+) opposite to the polarity (−) of the toner charged). For obtaining the above-described nip pressure steadily, one of the transfer roller 56 and the intermediate transfer belt driving roller 52 comprises a hard material (e.g., metal or the like) and the other comprises a soft material such as an elastic roller (e.g., elastic rubber roller, expanded resin roller, or the like).

Toner thus attached to the intermediate transfer belt 51 by contact between the photoreceptor drum 10 and the intermediate transfer belt 51 or residual toner remaining on the intermediate transfer belt 51 without having been transferred onto the recording sheet by the transfer roller 56, is removed and recovered by the intermediate transfer belt cleaning unit 55. The intermediate transfer belt cleaning unit 55 includes, for example, a cleaning blade as a cleaning member in contact with the intermediate transfer belt 51. The intermediate transfer belt 51 contacted by the cleaning blade is supported by the intermediate transfer belt driven roller 53 from the reverse side thereof.

The cleaner unit 60 removes and recovers residual toner that remains on the peripheral surface of the photoreceptor drum 10 after the image transfer operation following the developing operation.

The fixing unit 70 includes a heating roller 71 and a pressurizing roller 72 which are configured to rotate while nipping a sheet therebetween. The heating roller 71 is controlled by a control section based on signals from a non-illustrated temperature detector so that a predetermined fixing temperature is reached. The heating roller 71 has the function of fusing, mixing and pressure-contacting the toner image transferred to the sheet by heat-bonding the toner to the sheet cooperatively with the pressurizing roller 71, thereby fixing the toner image onto the sheet by heat. An external heating belt 73 is provided for heating the heating roller 71 from the outside.

The sheet output section 90 has a catch tray 91 and sheet output rollers 92. The recording sheet having passed through the fixing unit 70 is outputted onto the catch tray 91 by passing between the sheet output rollers 92. The catch tray 91 is a tray for accumulating sheets finished with printing.

In cases where double-side printing is requested, when a sheet having been finished with one-side printing as described above and passed through the fixing unit 70 is held between the sheet output rollers 92 at its trailing edge, the sheet output rollers 92 rotate backwardly to feed the sheet to feed rollers 102 and then to feed rollers 103. Thereafter, the sheet is subjected to reverse-side printing after having passed between registration rollers 104 and is then outputted onto the catch tray 91.

Figure 2:
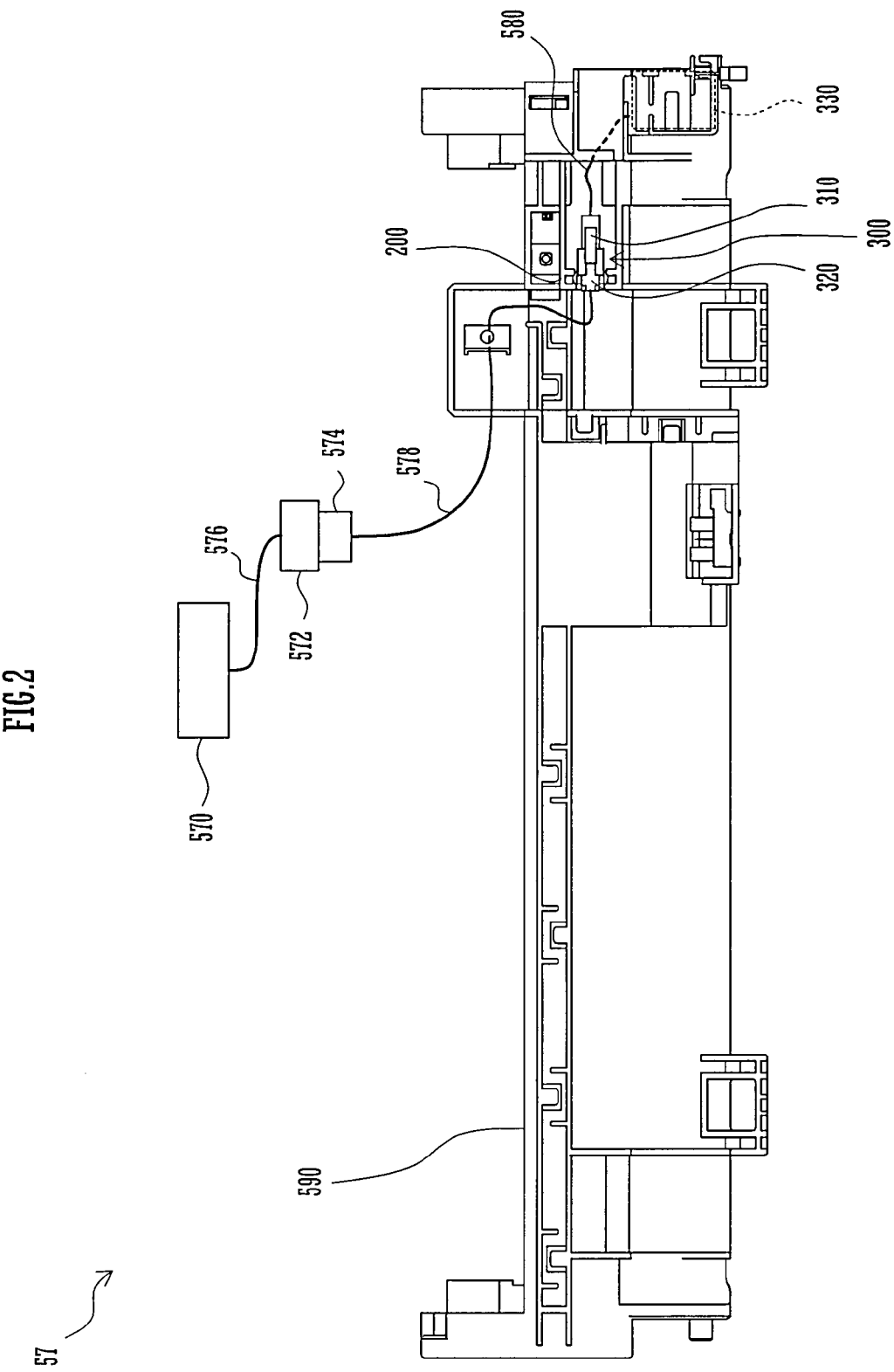
FIG. 2 is a plan view of the secondary transfer belt unit having the mounting structure according to the embodiment of the present invention.

FIG. 2 is a plan view of the secondary transfer belt unit 57 having the mounting structure 200 according to the embodiment of the present invention.

In the present embodiment, description is made of the secondary transfer belt unit 57 as an example of the "functional unit". The secondary transfer belt unit 57 includes an electromagnetic clutch 330, a housing 590, a mounting structure 200, and a coupler pair 300. The electromagnetic clutch 330 is equivalent to the "electrical part" defined by the present invention. The electromagnetic clutch 330 controls the operation of a secondary transfer driving roller 58. The electromagnetic clutch 330 receives electric power and control signals inputted thereto from a power control unit 570. The housing 590 supports the electromagnetic clutch 330. The mounting structure 200 will be described later.

Though the secondary transfer belt unit 57 of the present embodiment is described as the "functional unit", the "functional unit" is not limited to the secondary transfer belt unit 57. For example, the fixing unit 70 may be the "functional unit". Further, though the electromagnetic clutch 330 of the present embodiment is described as an example of the "electrical part", the "electrical part" is not limited to the electromagnetic clutch 330. For example, the driving motor may be the "electrical part".

The electromagnetic clutch 330 and the power control unit 570 are interconnected through electrical wiring lines 576, 578 and 580 provided with first and second couplers 310 and 320 at an intermediate point. The first coupler 310 and the second coupler 320 form the coupler pair 300 and can be detachably coupled to each other. The coupler pair 300 is equivalent to the "component" defined by the present invention. The coupler pair 300 is mounted on the mounting structure 200.

Though the coupler pair 300 of the present embodiment is described as the "component", the "component" is not limited to the coupler pair 300. For example, a blower may be the "component".

In an exemplary case, the first coupler 310 is a male coupler and the second coupler 320 is a female coupler. The first and second couplers 310 and 320 are terminals for connecting a plurality signal lines to their associated signal lines collectively. Though each of the electrical wiring lines 576, 578 and 580 is shown as a single line in FIG. 2, each electrical wiring line comprises a plurality of signal lines actually.

The power control unit 570 is connected to a first connection terminal 572 through the electrical wiring line 576. The second coupler 320 is connected to a second connection terminal 574 through the electrical wiring line 578, the second connection terminal 574 being detachably connectable to the first connection terminal 572. The first coupler 310 is connected to the electromagnetic clutch 330 through the electrical wiring line 580.

In replacement of the electromagnetic clutch 330 for example, the coupler pair 300 is removed from the mounting structure 200 and then the first coupler 310 is detached from the second coupler 320. Subsequently, the first coupler 310 of replacing electromagnetic clutch 330 is coupled to the second coupler 320, followed by the mounting of the coupler pair 300 on the mounting structure 200.

Figure 3:
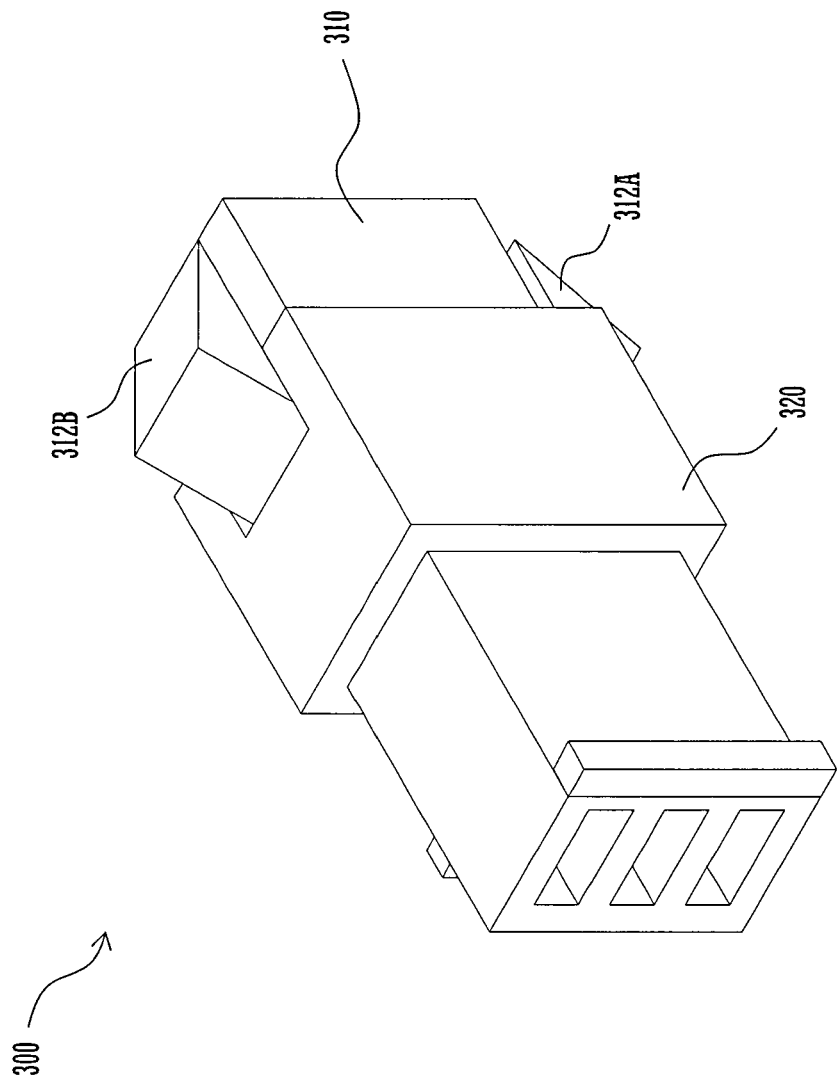
FIG. 3 is a perspective view illustrating a coupler pair to be mounted on the mounting structure according to the embodiment of the present invention.

FIG. 3 is a perspective view illustrating the coupler pair 300 to be mounted on the mounting structure 200 according to the embodiment of the present invention.

As described above, the coupler pair 300 includes the first coupler 310 and the second coupler 320. The first coupler 310 has engagement arms 312A and 312B. In the present embodiment, the engagement arms 312A and 312B are respectively formed on opposite sides of the coupler pair 300. The second coupler 320 is fitted over the first coupler 310 to form the coupler pair 300. In mounting the coupler pair 300, the coupler pair 300 is removably inserted into the mounting structure 200 to be described later.

Figure 4:
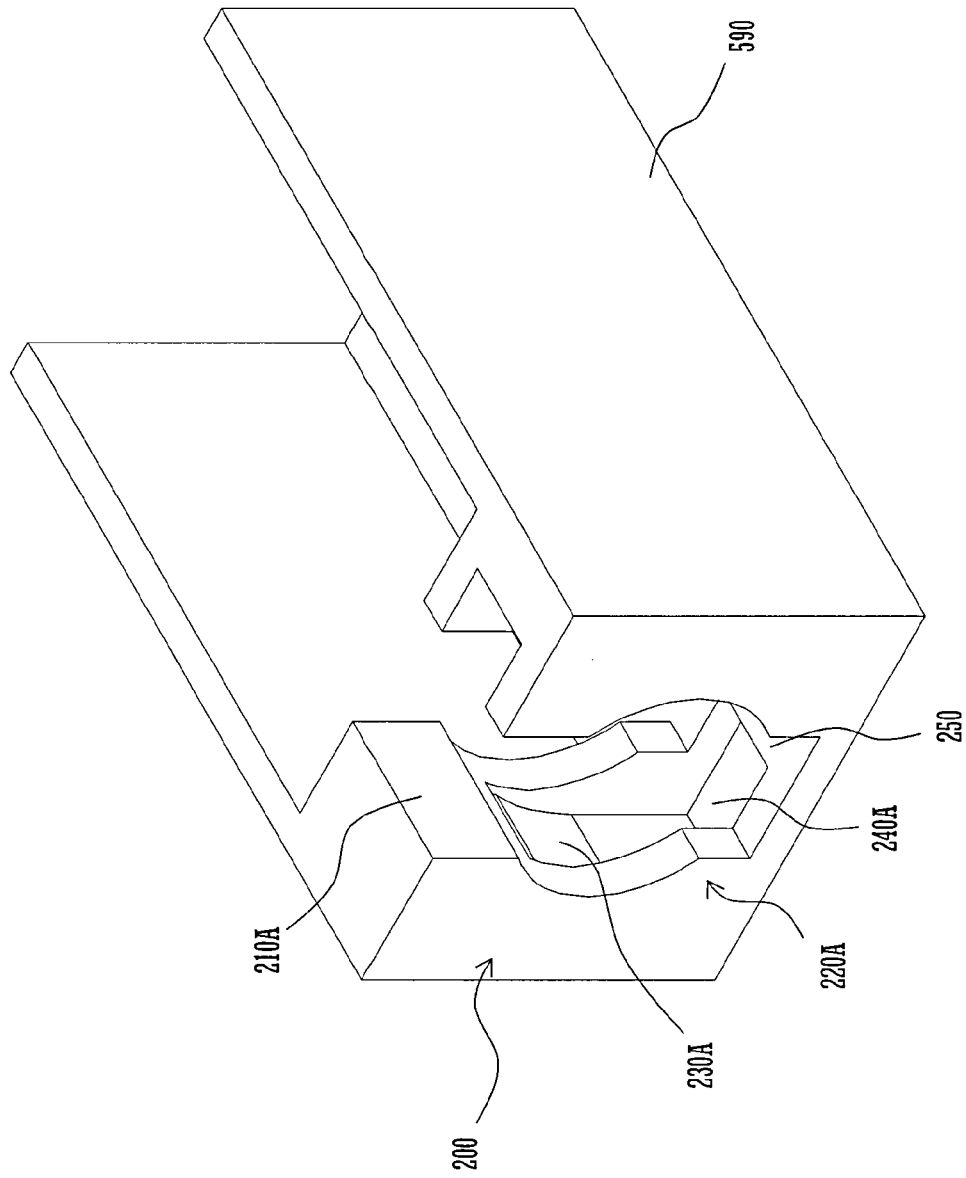
FIG. 4 is a perspective view of the mounting structure according to the embodiment of the present invention.
Figure 5:
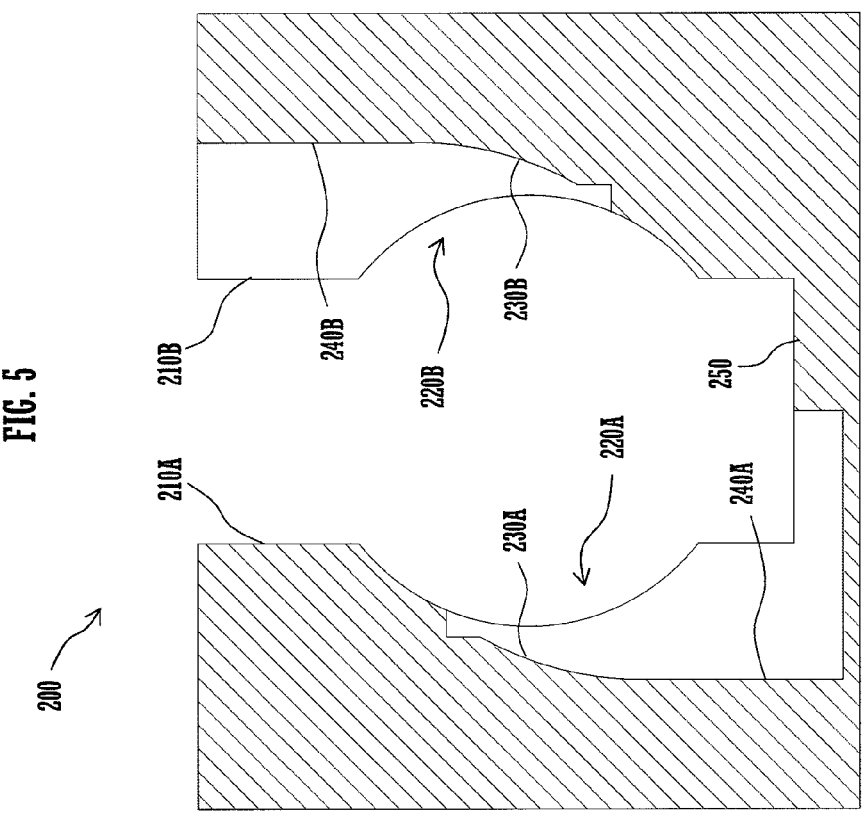
FIG. 5 is a front elevational view of the mounting structure according to the embodiment of the present invention.
Figure 6:
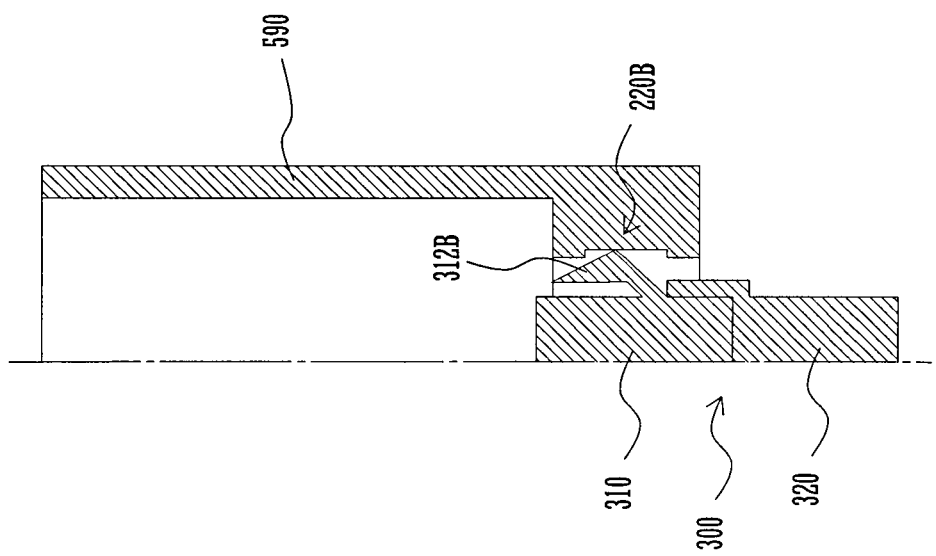
FIG. 6 is a sectional plan view illustrating the relation between the coupler pair and the mounting structure according to the embodiment of the present invention.

FIG. 4 is a perspective view illustrating the mounting structure 200 according to the embodiment of the present invention. FIG. 5 is a front elevational view of the mounting structure 200 according to the embodiment of the present invention. FIG. 6 is a sectional plan view illustrating the relation between the coupler pair 300 and the mounting structure 200 according to the embodiment of the present invention.

The mounting structure 200 includes first shape portions 210A and 210B, second shape portions 220A and 220B, and third shape portions 230A and 230B.

The first shape portions 210A and 210B are opposed to each other to define therebetween a passage which allows the component to be inserted into and withdrawn from the mounting structure 200 therethrough. The second shape portions 220A and 220B are opposed to each other to define therebetween a space which allows the coupler pair 300 inserted through the passage between the first shape portions 210A and 210B to rotate therein. The third shape portions 230A and 230B come into engagement with the engagement arms 312A and 312B, respectively, when the coupler pair 300 positioned between the second shape portions 220A and 220B is rotated through an angle of 90 degrees.

The third shape portions 230A and 230B are opposed to each other and incorporated in the second shape portions 220A and 220B. Though the present embodiment sets the predetermined angle to 90 degrees, any angle can be set as the predetermined angle as long as the angle enables the coupler pair 300 to be mounted on the mounting structure 200 stably.

The first shape portions 210A and 210B are configured to allow the coupler pair 300 to pass through the passage defined therebetween only when the engagement arms 312A and 312B are positioned to project in a vertically upward and downward direction from the coupler pair 300. That is, the first shape portions 210A and 210B are spaced apart from each other to such an extent as not to allow the coupler pair 300 to pass therebetween when the engagement arms 312A and 312B are positioned to project in any other direction from the coupler pair 300 than the vertically upward and downward direction.

The second shape portions 220A and 220B are configured to prevent the coupler pair 300 from coming off the mounting structure 200 through any other way than the passage defined between the first shape portions 210A and 210B. That is, the second shape portions 220A and 220B support the engagement arms 312A and 312B as shown in FIG. 6 and, hence, the coupler pair 300 is restrained from moving in the thrust direction. For this reason, even when force is exerted on the coupler pair 300 in the thrust direction, the coupler pair 300 fails to come off in the thrust direction.

The third shape portions 230A and 230B are configured to release the engagement with the engagement arms 312A and 312B when the coupler pair 300 is reversely rotated in a direction opposite to the direction of the rotation of the coupler pair 300 performed during the insertion of the coupler pair 300. That is, the engagement between the third shape portions 230A and 230B and the engagement arms 312A and 312B can be released by applying a force equal to and more than a predetermined force onto the coupler pair 300 in the direction opposite to the direction of the rotation of the coupler pair 300 performed during the insertion of the coupler pair 300.

The arrangement described above provides high operability in mounting the coupler pair 300 on the mounting structure 200 and, hence, the secondary transfer belt unit 57 provided with the mounting structure 200 allows its maintenance or like operations to be performed easily. The arrangement also provides high operability in removing the coupler pair 300 from the mounting structure 200 and, hence, the secondary transfer belt unit 57 provided with the mounting structure 200 allows its maintenance or like operations to be performed easily. Further, the arrangement enables the coupler pair 300 to be mounted and removed without applying an excess force onto the engagement arms 312A and 312B. For this reason, damage to the engagement arms 312A and 312B of the coupler pair 300 can be obviated.

Preferably, the mounting structure 200 further includes fourth shape portions 240A and 240B.

The fourth shape portions 240A and 240B guide the engagement arms 312A and 312B during the period in which the coupler pair 300 inserted through the passage between the first shape portions 210A and 210B is rotated through the angle of 90 degrees and during the period in which the coupler pair 300 is reversely rotated in the direction opposite to the direction of the rotation of the coupler pair 300 performed during the insertion of the coupler pair 300 from the position in which the engagement arms 312A and 312B are in engagement with the third shape portions 230A and 230B up to the position in which the engagement arms 312A and 312B become positioned to project in the vertically upward and downward direction from the coupler pair 300.

The fourth shape portions 240A and 240B are opposed to each other and incorporated in the second shape portions 220A and 220B.

This feature enhances the operability in mounting the coupler pair 300 on the mounting structure 200 and removing the coupler pair 300 therefrom and, hence, the secondary transfer belt unit 57 provided with the mounting structure 200 allows its maintenance or like operations to be performed more easily. More preferably, the mounting structure 200 further includes a fifth shape portion 250.

The fifth shape portion 250 comes into contact with a downstream end portion of the coupler pair 300 inserted through the passage between the first shape portions 210A and 210B which is positioned on the downstream side in the direction of the insertion of the coupler pair 300.

The fifth shape portion 250 is incorporated in the second shape portions 220A and 220B.

With this feature, the coupler pair 300 inserted through the passage between the first shape portions 210A and 210B is brought into contact with the fifth shape portion 250, which can inform the user of the timing to start rotating the coupler pair 300. This enhances the operability in mounting the coupler pair 300 on the mounting structure 200 and, hence, the secondary transfer belt unit 57 provided with the mounting structure 200 allows its maintenance or like operations to be performed more easily.

The engagement arms 312A and 312B preferably have elasticity. This feature enables the third shape portions 230A and 230B to come into pressure contact with the engagement arms 312A and 312B when the coupler pair 300 inserted through the passage between the first shape portions 210A and 210B is rotated through the angle of 90 degrees.

With this feature, frictional force resulting from the pressure contact between the third shape portions 230A and 230B and the engagement arms 312A and 312B serves to inform the user that the engagement between the third shape portions 230A and 230B and the engagement arms 312A and 312B has been made. Therefore, it is possible to prevent the user from rotating the coupler pair 300 excessively, thereby to prevent the engagement arms 312A and 312B from being overloaded.

Figure 7:
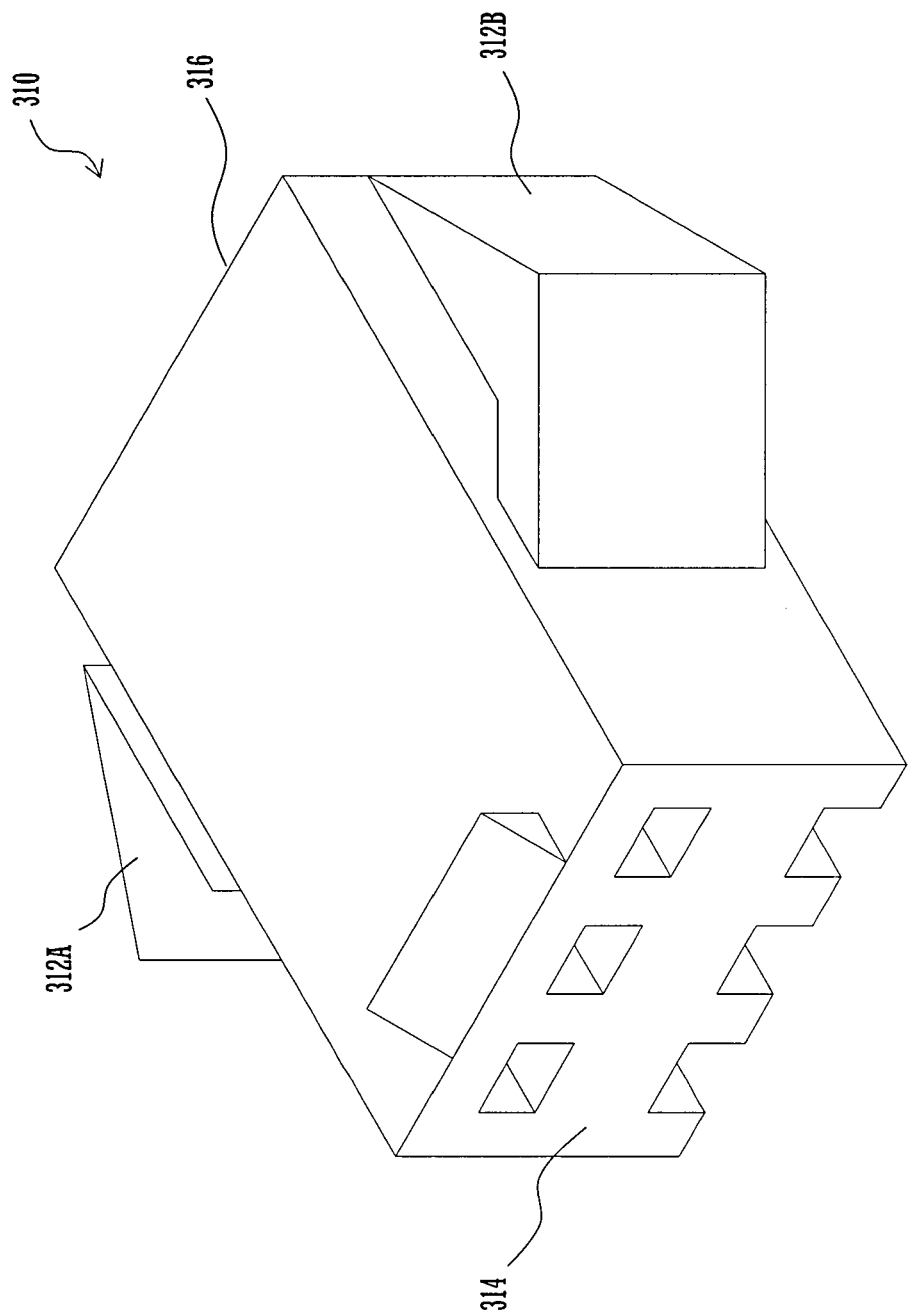
FIG. 7 is a perspective view illustrating a first coupler forming part of the coupler pair to be mounted on the mounting structure according to the embodiment of the present invention.

FIG. 7 is a perspective view illustrating the first coupler 310 forming part of the coupler pair 300 to be mounted on the mounting structure 200 according to the embodiment of the present invention.

The first coupler 310 has the engagement arms 312A and 312B, an insert portion 314, and a connecting portion 316.

The engagement arms 312A and 312B are engageable with the third shape portions 230A and 230B of the mounting structure 200. The insert portion 314 is a portion which is inserted into the second coupler 320 and joined to the second coupler 320. The connecting portion 316 is a portion to be connected to the electrical wiring line 580.

Figure 8:
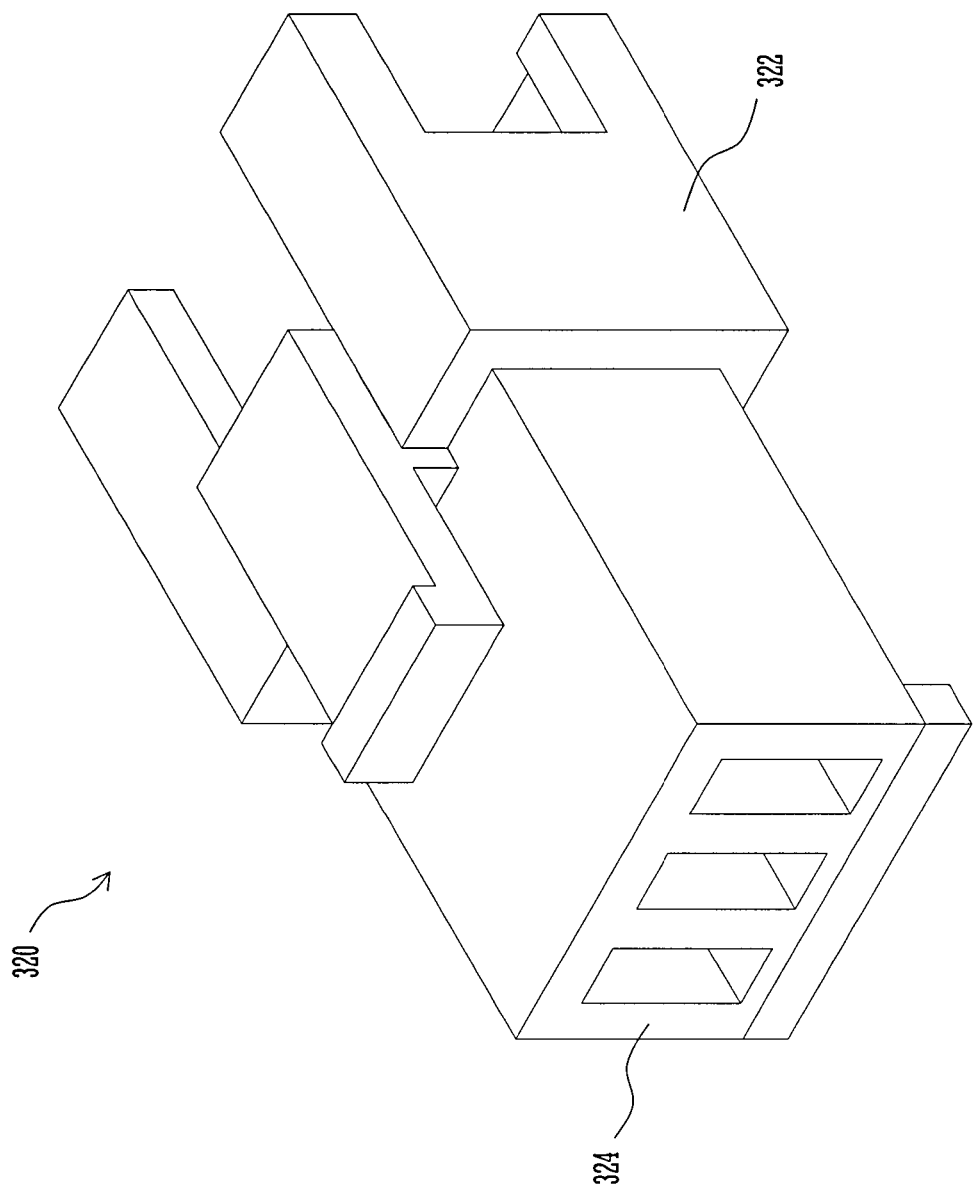
FIG. 8 is a perspective view illustrating a second coupler forming part of the coupler pair to be mounted on the mounting structure according to the embodiment of the present invention.
Figure 9:
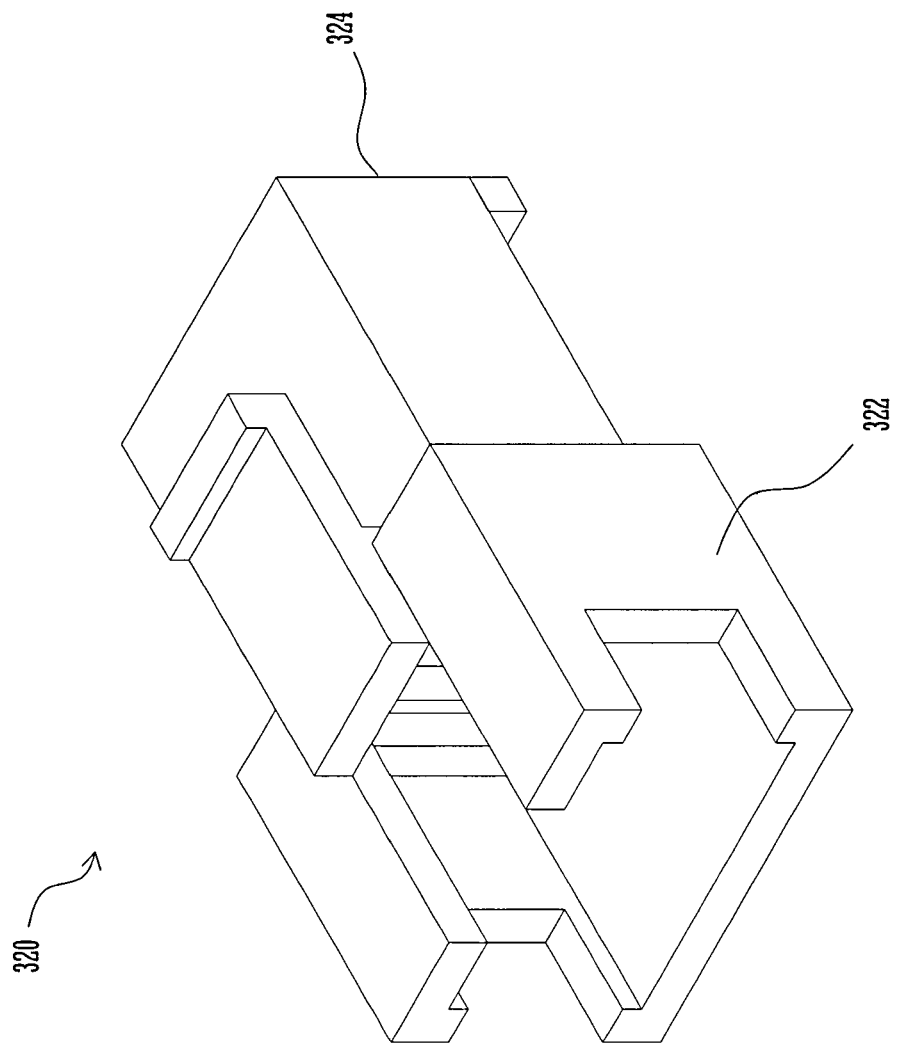
FIG. 9 is a perspective view of the second coupler forming part of the coupler pair to be mounted on the mounting structure according to the embodiment of the present invention.

FIGS. 8 and 9 are perspective views each illustrating the second coupler 320 forming part of the coupler pair 300 to be mounted on the mounting structure 200 according to the embodiment of the present invention.

The second coupler 320 has a fit-over portion 322 and a connecting portion 324.

The fit-over portion 322 is a portion which fits over the first coupler 310 so as to be joined to the first coupler 310. The connecting portion 324 is a portion to be connected to the electrical wiring line 578.

FIGS. 10 to 13 are perspective views illustrating how the coupler pair 300 is mounted on the mounting structure 200 according to the embodiment of the present invention. FIG. 14 is a sectional view illustrating the coupler pair 300 in a mounted state on the mounting structure 200 according to the embodiment of the present invention.

Figure 10:
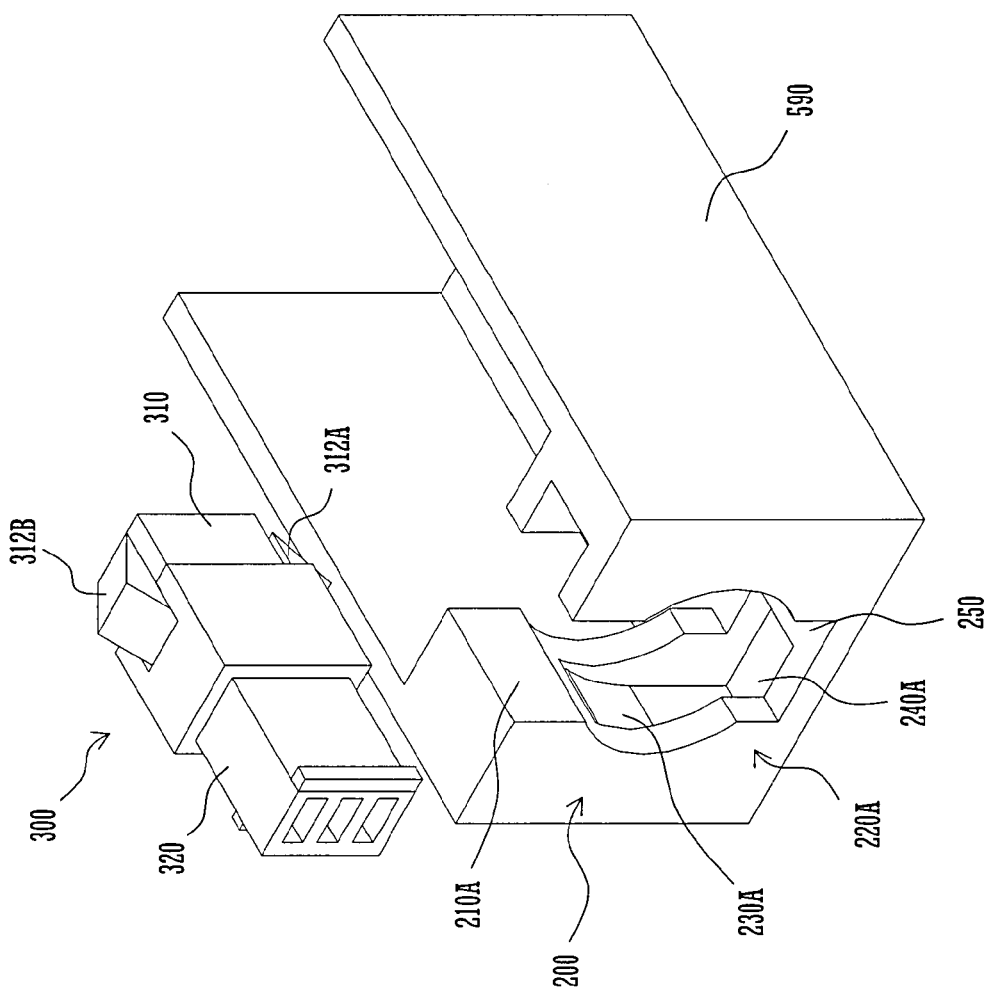
FIG. 10 is a perspective view illustrating how the coupler pair is mounted on the mounting structure according to the embodiment of the present invention.

FIG. 10 illustrates the coupler pair 300 in a state assumed before its mounting on the mounting structure 200. In mounting the coupler pair 300 on the mounting structure 200, the coupler pair 300 has to assume the position shown in FIG. 10, namely, the position in which the engagement arms 312A and 312B are positioned to project in the vertically upward and downward direction from the coupler pair 300.

Figure 11:
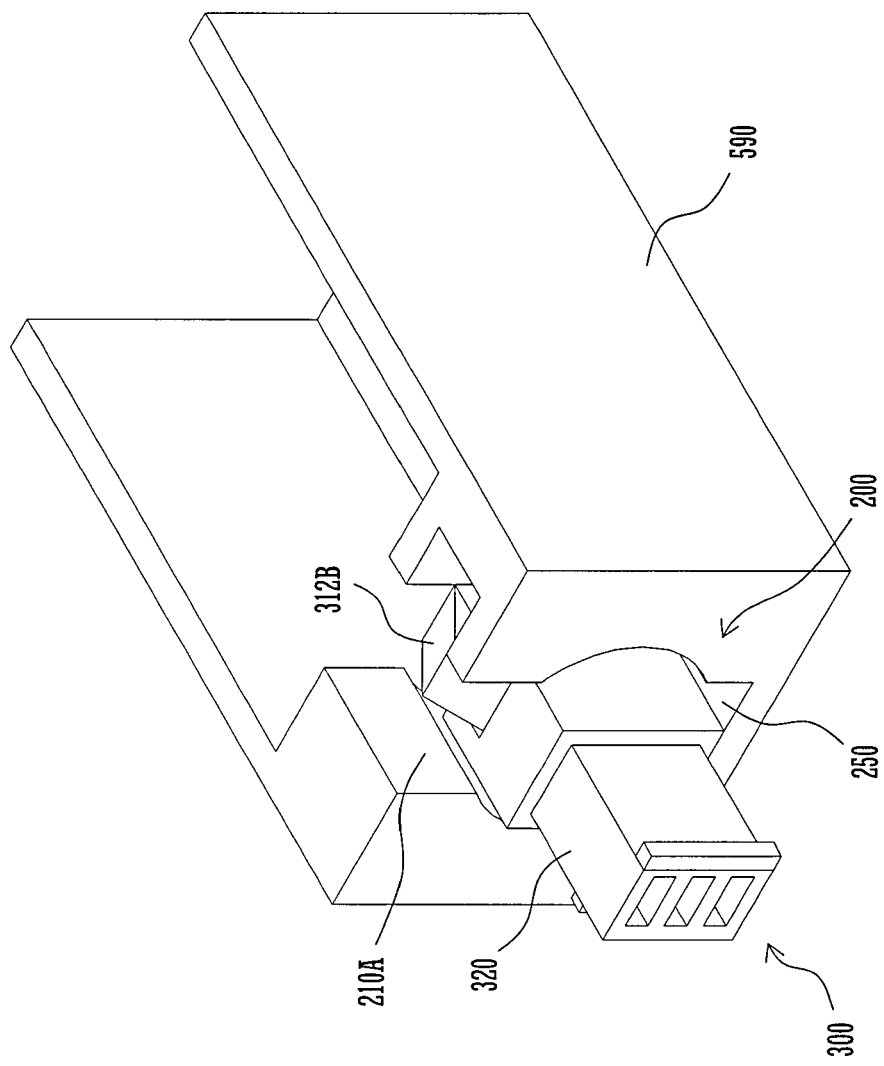
FIG. 11 is a perspective view illustrating how the coupler pair is mounted on the mounting structure according to the embodiment of the present invention.

FIG. 11 illustrates the coupler pair 300 in a state in which the coupler pair 300 is brought into contact with the fifth shape portion 250 after having passed through the passage between the first shape portions 210A and 210B. In this state, the engagement arms 312A and 312B are supported by the second shape portions 220A and 220B. For this reason, even when force is exerted on the coupler pair 300 in the thrust direction (i.e., longitudinal direction), the coupler pair 300 fails to come off in the thrust direction. Further, since the coupler pair 300 is brought into contact with the fifth shape portion 250, the user can be informed of the timing to start rotating the coupler pair 300.

Figure 12:
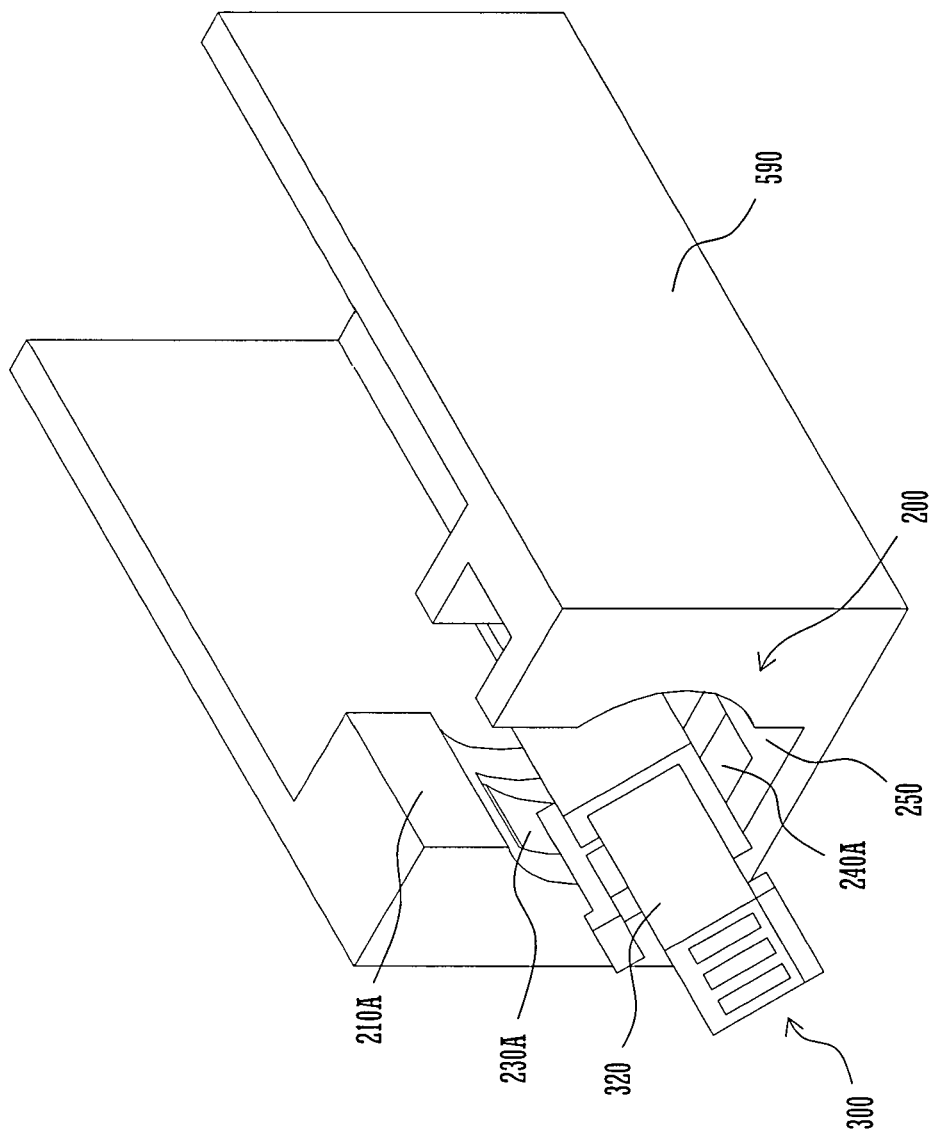
FIG. 12 is a perspective view illustrating how the coupler pair is mounted on the mounting structure according to the embodiment of the present invention.

FIG. 12 illustrates the coupler pair 300 in a state in which the coupler pair 300 is rotated in the space defined between the second shape portions 220A and 220B through an angle of 45 degrees from the position taken at the time of its insertion into the mounting structure 200. In this state, the engagement arms 312A and 312B are guided by the fourth shape portions 240A and 240B and, therefore, the user can rotate the coupler pair 300 smoothly. Further, the engagement arms 312A and 312B are supported by the second shape portions 220A and 220B. For this reason, even when force is exerted on the coupler pair 300 in the thrust direction (i.e., longitudinal direction), the coupler pair 300 fails to come off in the thrust direction.

Figure 13:
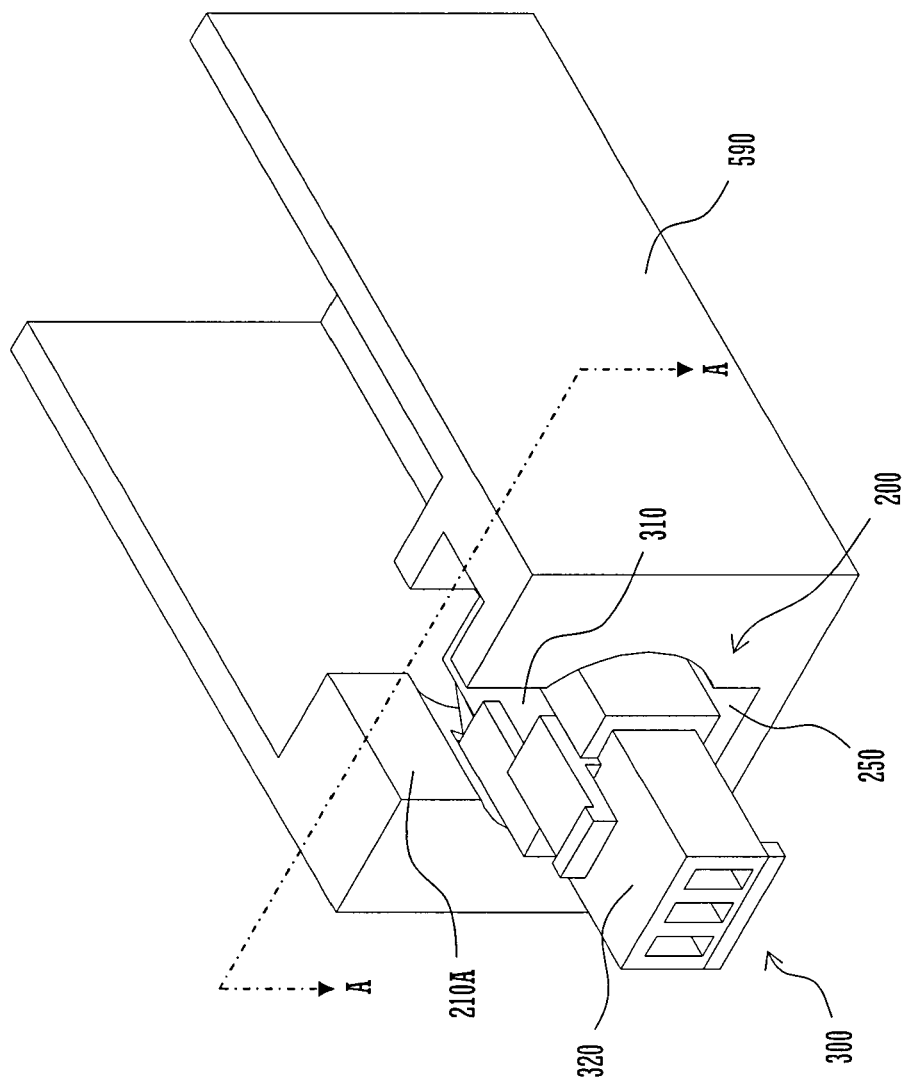
FIG. 13 is a perspective view illustrating how the coupler pair is mounted on the mounting structure according to the embodiment of the present invention.

FIG. 13 illustrates the coupler pair 300 in a mounted state on the mounting structure 200. In this state, the engagement arms 312A and 312B are pressed against the third shape portions 230A and 230B and, hence, the coupler pair 300 is firmly mounted on the mounting structure 200. Further, the engagement arms 312A and 3128 are supported by the second shape portions 220A and 220B. For this reason, even when force is exerted on the coupler pair 300 in the thrust direction (i.e., longitudinal direction), the coupler pair 300 fails to come off in the thrust direction. Still further, the frictional force resulting from the pressure contact between the third shape portions 230A and 230B and the engagement arms 312A and 3128 serves to inform the user that the engagement between the third shape portions 230A and 230B and the engagement arms 312A and 3128 has been made. Therefore, it is possible to prevent the user from rotating the coupler pair 300 excessively, thereby to prevent the engagement arms 312A and 312B from being overloaded.

In removing the coupler pair 300 from the mounting structure 200, the coupler pair 300 is simply operated in the order of FIGS. 13, 12, 11 and 10. Specifically, the coupler pair 300 is reversely rotated in the direction opposite to the direction of the rotation of the coupler pair 300 performed during its insertion into the mounting structure 200, thereby releasing the engagement between the third shape portions 230A and 230B and the engagement arms 312A and 312B. The coupler pair 300 is further reversely rotated until the engagement arms 312A and 312B become positioned to project in the vertically upward and downward direction from the coupler pair 300. Finally, with the vertical position kept as it is, the coupler pair 300 is withdrawn through the passage between the first shape portions 210A and 210B.

Preferably, the coupler pair 300 is free to be positioned downstream of the first shape portions 210A and 210B in the direction in which the mounting structure 200 is withdrawn from the mounting structure 200, as shown in FIG. 10.

With this feature, the operability in handling the coupler pair 300 relative to the mounting structure 200 is improved because the first coupler 310 and the second coupler 320 can be coupled to and detached from each other by utilizing the space above the first shape portions 210A and 210B.

The foregoing embodiments should be construed to be illustrative and not limitative of the present invention in all the points. The scope of the present invention is defined by the following claims, not by the foregoing embodiments. Further, the scope of the present invention is intended to include the scopes of the claims and all possible changes and modifications within the senses and scopes of equivalents.

What is claimed is:

1. A functional unit comprising:
a component having opposite sides formed on a downstream end section with respective engagement arms having elasticity that project outward from the opposite sides of the downstream end section, and a housing provided with a mounting structure for mounting the component thereon,
the mounting structure comprising:
a pair of first shape sections opposed to each other to define therebetween a passage which allows the component to be inserted into and withdrawn from the mounting structure therethrough; and
a pair of second shape sections opposed to each other to define therebetween a space which allows the component inserted through the passage between the pair of first shape sections to rotate therein, wherein:
the pair of second shape sections include a pair of third shape sections which are opposed to each other;
the pair of third shape sections, on a downstream side in a predetermined first direction, have a section in which a spacing between the third shape sections is narrower than a spacing between other sections and are configured to come into engagement with the engagement arms by an increase of frictional force between the pair of third shape sections and the engagement arms by being pressed against the engagement arms by the elasticity of the engagement arms when the component positioned between the pair of second shape sections is rotated through a predetermined angle in the first direction;
the pair of first shape sections are configured to allow the component to pass through the passage only when the engagement arms are positioned to project from the component in an insertion/withdrawal direction with respect to the pair of first shape sections;
the pair of second shape sections are configured to prevent the component from coming off the mounting structure through any other way than the passage defined between the pair of first shape sections;
the pair of third shape sections are configured to stop the rotation of the component at a predetermined position in the first direction as a direction of the rotation during engagement of the component and to release the engagement with the engagement arms when the component is rotated in a second direction as a direction opposite to the first direction;

a pair of fourth shape sections which are respectively continuous to the pair of third shape sections in a direction along the first direction; and a fifth shape section which comes into contact, in the direction of the insertion of the component, with the downstream end section of the component inserted through the passage between the pair of first shape sections in the insertion/withdrawal direction, the fifth shape section being incorporated in the pair of second shape sections;

wherein when the fifth shape section comes into contact with the downstream end section during insertion of the component, the engagement arms project into a groove defined by the fourth shape sections.

2. The functional unit according to claim 1, wherein the fourth shape sections guide the engagement arms during a period in which the component inserted through the passage between the pair of first shape sections is rotated through the predetermined angle in the first direction and during a period in which the component is rotated in the second direction from a position in which the engagement arms are in engagement with the pair of third shape sections up to a position in which the engagement arms are positioned in the insertion/withdrawal direction with respect to the component, the pair of fourth shape sections being opposed to each other and incorporated in the pair of second shape sections.

3. The functional unit according to claim 1, wherein:

the component is a coupler pair comprising first and second couplers which are detachably coupled to each other; and the mounting structure further comprises a space in which the coupler pair is free to be positioned downstream of the pair of first shape sections in a direction in which the coupler pair is withdrawn from the mounting structure.

4. The functional unit according to claim 1 further comprising:

an electrical part; wherein:

the housing supports the electrical part.

* * * * *